United States Patent
Kim et al.

(10) Patent No.: US 8,964,066 B2
(45) Date of Patent: *Feb. 24, 2015

(54) APPARATUS AND METHOD FOR GENERATING IMAGE INCLUDING MULTIPLE PEOPLE

(71) Applicant: Samsung Electronics Co., Ltd., Gyeonggi-do (KR)

(72) Inventors: Chang-Han Kim, Seoul (KR); Tae-Hwa Hong, Seoul (KR); Chung-Hoon Kim, Gyeonggi-do (KR); Sung-Dae Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 29 days.

This patent is subject to a terminal disclaimer.

(21) Appl. No.: 13/854,460

(22) Filed: Apr. 1, 2013

(65) Prior Publication Data
US 2013/0215293 A1 Aug. 22, 2013

Related U.S. Application Data

(63) Continuation of application No. 12/833,481, filed on Jul. 9, 2010, now Pat. No. 8,411,171.

(30) Foreign Application Priority Data

Jul. 15, 2009 (KR) .................. 10-2009-0064488

(51) Int. Cl.
*H04N 5/262* (2006.01)
*H04N 5/265* (2006.01)
*G06K 9/00* (2006.01)
*G06K 9/03* (2006.01)
*H04N 5/232* (2006.01)

(52) U.S. Cl.
CPC ............ *H04N 5/265* (2013.01); *G06K 9/00228* (2013.01); *G06K 9/03* (2013.01); *H04N 5/232* (2013.01); *H04N 5/23219* (2013.01); *H04N 5/23293* (2013.01)
USPC .................... 348/239; 348/222.1; 382/103

(58) Field of Classification Search
CPC ................................................. H04N 5/262
USPC ......... 348/239, 222.1, 78, 169, 349; 382/103, 382/115–118, 190–195
See application file for complete search history.

(56) References Cited

U.S. PATENT DOCUMENTS

| | | |
|---|---|---|
| 2004/0223649 A1 | 11/2004 | Zacks et al. |
| 2005/0129324 A1 | 6/2005 | Lemke |
| 2006/0061598 A1 | 3/2006 | Mino et al. |
| 2008/0037841 A1 | 2/2008 | Ogawa |
| 2010/0066840 A1 | 3/2010 | Asukai et al. |

*Primary Examiner* — Tuan Ho
(74) *Attorney, Agent, or Firm* — The Farrell Law Firm, P.C.

(57) ABSTRACT

Provided is an apparatus and a method for generating an image including multiple people, in which images are photographed, face images are detected from each of the photographed images, a face score for each of the face images detected from the photographed images is calculated, it is determined whether each of the face scores calculated for each of the face images is at least equal to a predetermined threshold, and each of face images having a highest face score for each of the face images is synthesized, to output the synthesized image as a final image, in order to generate a most satisfactory photographed image for a user.

23 Claims, 7 Drawing Sheets

APPARATUS AND METHOD FOR GENERATING IMAGE INCLUDING MULTIPLE PEOPLE

PRIORITY

This application is a Continuation Application of U.S. patent application Ser. No. 12/833,481, which was filed at the U.S. Patent and Trademark Office on Jul. 9, 2010, and which claims priority under 35 U.S.C. §119(a) to a Korean Patent Application entitled "Apparatus and Method for Generating Image Including Multiple People" filed in the Korean Industrial Property Office on Jul. 15, 2009 and assigned Ser. No. 10-2009-0064488, the content of which is incorporated herein by reference.

BACKGROUND OF THE INVENTION

1. Field of the Invention

The present invention relates generally to an apparatus and a method for generating an image, and more particularly to an apparatus and a method for generating an image including multiple photographed people.

2. Description of the Related Art

In general, when a user photographs multiple people, such as in a group picture, undesirable conditions may occur, such as when any of the people may close their eyes or exhibit an uneasy expression. If an image is photographed during such conditions, the user must continuously re-take group pictures in order to photograph an image that does not include people with closed eyes or uneasy expressions. Further, even if a photograph does not include closed eyes, uneasy looks, or people not looking at the camera, for example, a person may not be satisfied with the photographed picture, thereby requiring the user to re-take the group picture again. As such, it is difficult to take the group picture such that every photographed person is satisfied with the photographed image.

In this respect, in order to obtain a satisfactory group picture, the user can use a method of photographing a plurality of images and synthesizing the photographed images using an apparatus or a program capable of synthesizing the images.

Further, when the group picture is taken, if people who blinked their eyes or have uneasy expressions are detected in a photographed image, it is possible to minimize the appearance of the eye blink, etc., by continuous re-photographing.

As such, when the user takes a photograph of multiple people, such as in a group picture, the user may optionally photograph multiple images and synthesize the photographed multiple images by using an image synthesis program, or detect eye blinking or smiling faces for continuous photographing.

However, when the user synthesizes the images using an image synthesis program, that the user is inconvenienced, as the user must move the images to a device in which the image synthesis program is installed and directly drive the image synthesis program so as to synthesize the multiple images into a single image.

Further, when images are continuously photographed according to detection of eye blinking or smiles, although images without eye blinking or uneasy looks may be photographed, it nonetheless remains difficult to photograph images with which the user can be satisfied.

SUMMARY OF THE INVENTION

Accordingly, the present invention has been made to solve the above-stated problems occurring in the prior art, and the present invention provides an apparatus and a method for generating a satisfactory image for a user when a user takes a photograph of multiple people.

In accordance with an aspect of the present invention, an apparatus for generating an image including multiple photographed people is provided. The apparatus includes an image photographing unit for photographing images; a face image detection unit for detecting face images for each of the photographed images; a face score calculation unit for calculating a face score for each of the face images detected from each of the photographed images; an image determination unit for determining whether each of the face scores calculated for each of the face images is at least equal to a predetermined threshold; and an image synthesis unit for synthesizing each of face images having a highest face score among the face images, and outputting the synthesized image as a final image.

In accordance with another aspect of the present invention, a method for generating an image including multiple photographed people is provided. The method includes photographing images; detecting face images from each of the photographed images; calculating a face score for each of the face images detected from each of the photographed images; determining whether the face score detected for each of the face images is at least equal to a predetermined threshold; synthesizing each of face images having a highest face score among the face images; and outputting the synthesized image as a final image.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Hereinafter, embodiments of the present invention are described with reference to the accompanying drawings. Further, in the following description of the present invention, detailed descriptions of known functions and configurations incorporated herein are omitted when they may make the subject matter of the present invention rather unclear.

Figure 1:
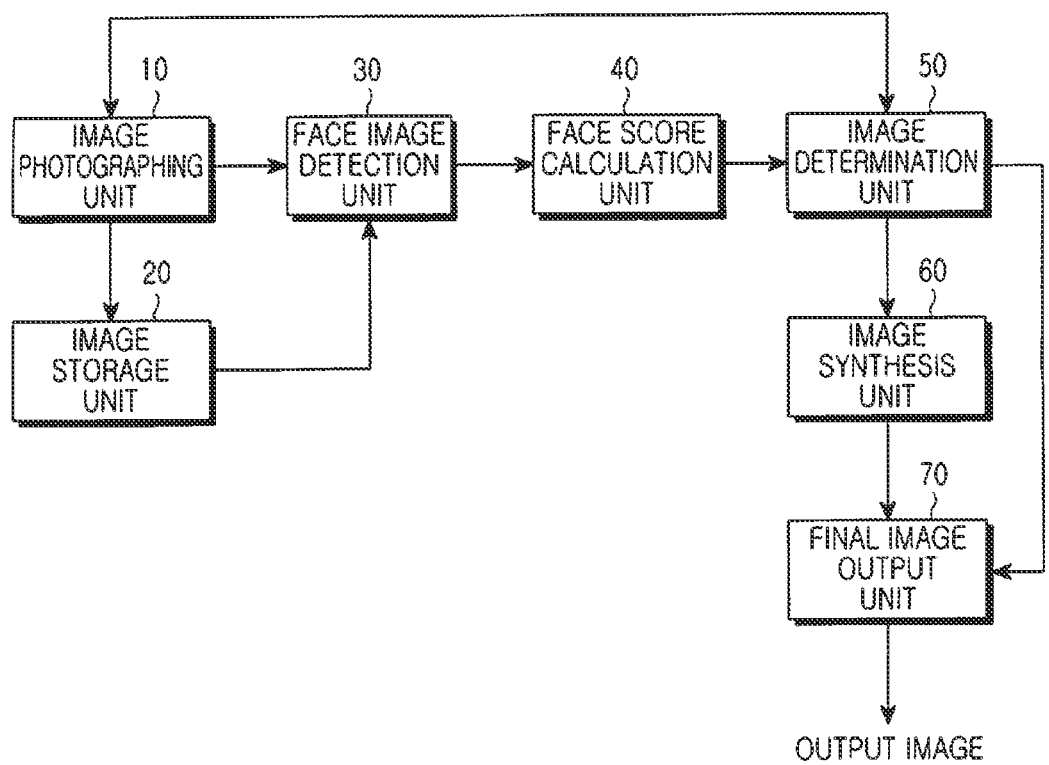
FIG. 1 is a block diagram illustrating an image photographing apparatus according to an embodiment of the present invention.

FIG. 1 is a diagram illustrating the construction of an image photographing apparatus according to an embodiment of the present invention.

Referring to FIG. 1, an image photographing apparatus according to an embodiment the present invention includes an image photographing unit 10, an image storage unit 20, a face image detection unit 30, a face score calculation unit 40, an image determination unit 50, an image synthesis unit 60, and a final image output unit 70.

The image photographing unit 10 includes a camera and outputs an optical signal from the camera as an image data.

The image storage unit 20 stores image data received from the image photographing unit 10 and a final image (not shown) generated according to an embodiment of the present invention.

The face image detection unit 30 detects multiple face images within the image input from the image photographing unit 10. The face image may be detected by various general methods for detecting a face image. Therefore, a detailed description thereof is omitted.

The face score calculation unit 40 calculates a face score for each of the multiple face images detected through the face image detection unit 30. The term "face score" refers to a score numerically expressing the degree of a quality of the face image in the photographed image, the quality corresponding to a degree of a user's satisfaction with the face image in the photographed image.

In particular, the face score calculation unit 40 receives scored values, which correspond to the degrees of quality of the multiple face images have been photographed, as input values, and obtains a single resultant value by applying functions, such as a linear summation, an application of a threshold value, or an application of a higher order function value, to the input values.

The degree of quality of the face image can be determined by a method, such as the blink detection, the expression detection, and the eye gaze estimation.

The face score is classified into a filtering face score and a selection face score. The filtering face score refers to a face score used in determining the re-photographing of an image and the selection face score refers to a face score used in determining whether an image is satisfactory for the user.

The face score calculation unit 40 calculates a face score for each of the face images and outputs the calculated face scores to the image determination unit 50.

The image determination unit 50 determines whether each of the multiple face scores input from the face score calculation unit 40 is at least equal to a predetermined threshold. The predetermined threshold is a predetermined value for determining whether to re-photograph an image.

If all of the calculated face scores are at least equal to the predetermined threshold, the image determination unit 50 directly outputs the photographed image to the final image output unit 70. However, if any of the calculated face scores is less than the predetermined threshold, the image determination unit 50 outputs an image re-photographing signal informing, the image photographing unit 10 of that an image will be re-photographed. The image determination unit 50 can continuously output an image re-photographing signal to the image photographing unit 10 until an image having at least one calculated face score at least equal to the threshold is included in the multiple photographed images generated through the re-photographing.

If the photographed image includes a face image having at least one face score at least equal to the threshold, the image determination unit 50 determines which face image has a highest face score from among the detected face images.

The image determination unit 50 also sets an image having the most face images having the face score at least equal to the predetermined threshold among the photographed images, respectively, as a reference image.

The image synthesis unit 60 synthesizes the set reference image with the face images determined through the image determination unit 50. More specifically, the synthesized image includes number of face images 'N' having the highest face score.

The final image output unit 70 outputs the synthesized image. At this time, the synthesized image can be displayed through a display unit (not shown).

Therefore, embodiments of the present invention provide an advantage, in that each of the face images having the highest face score among the multiple photographed images, are synthesized with one another, in order to conveniently generate satisfactory images for the user.

As described herein above, the face score is classified into a filtering face score and a selection face score to be calculated. Methods for generating the image using the calculated filtering face score and selection face score are described with reference to FIGS. 2 to 7.

A method for generating an image according to an embodiment of the present invention, in which an image is continuously photographed based on the filtering face score and the image is synthesized based on the selection face score among the photographed images, is described as follows with reference to FIG. 2.

Figure 2:
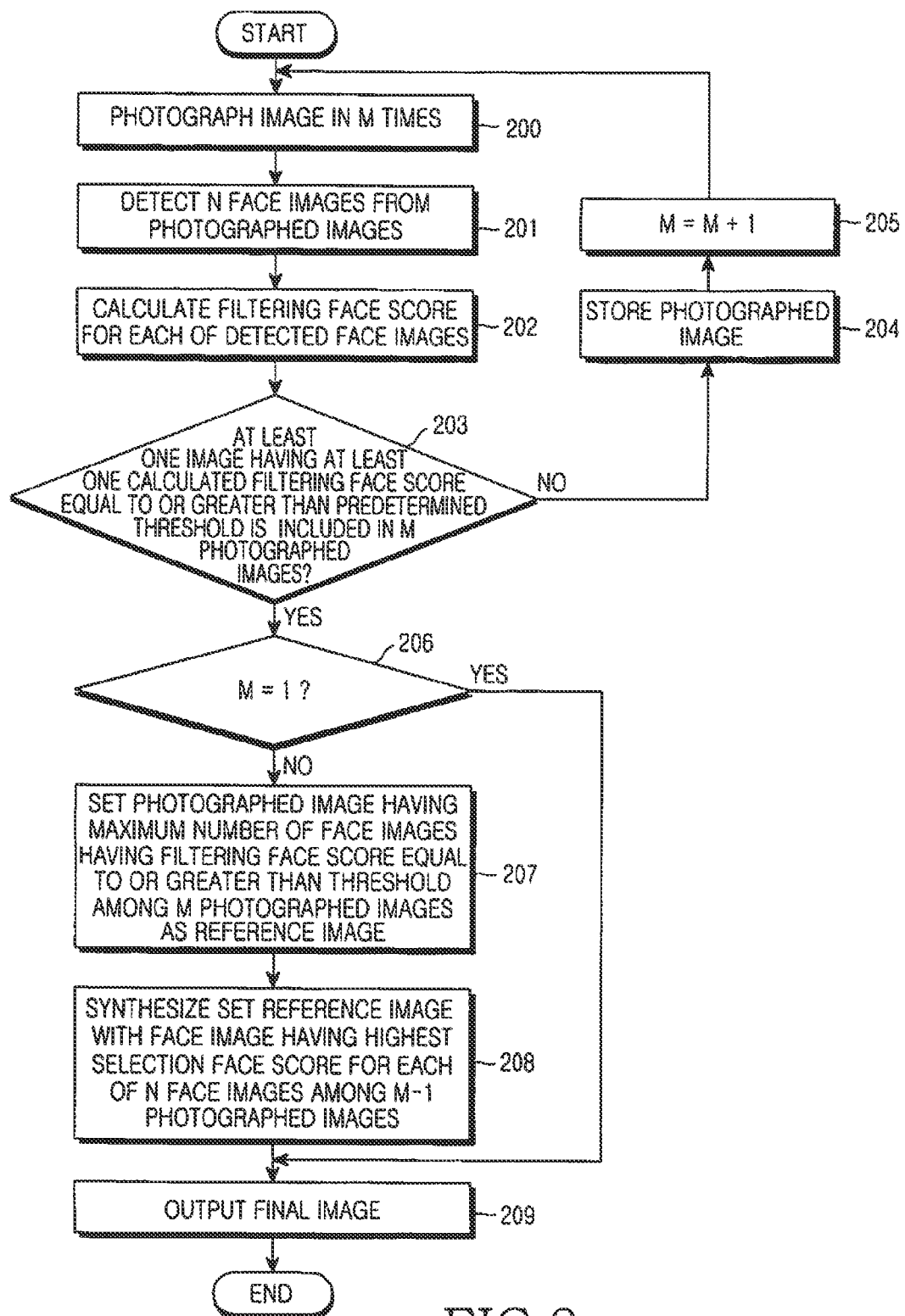
FIG. 2 is a flowchart illustrating a process of generating an image based on a filtering face score and a selection face score according to a first embodiment of the present invention.
Figure 3:
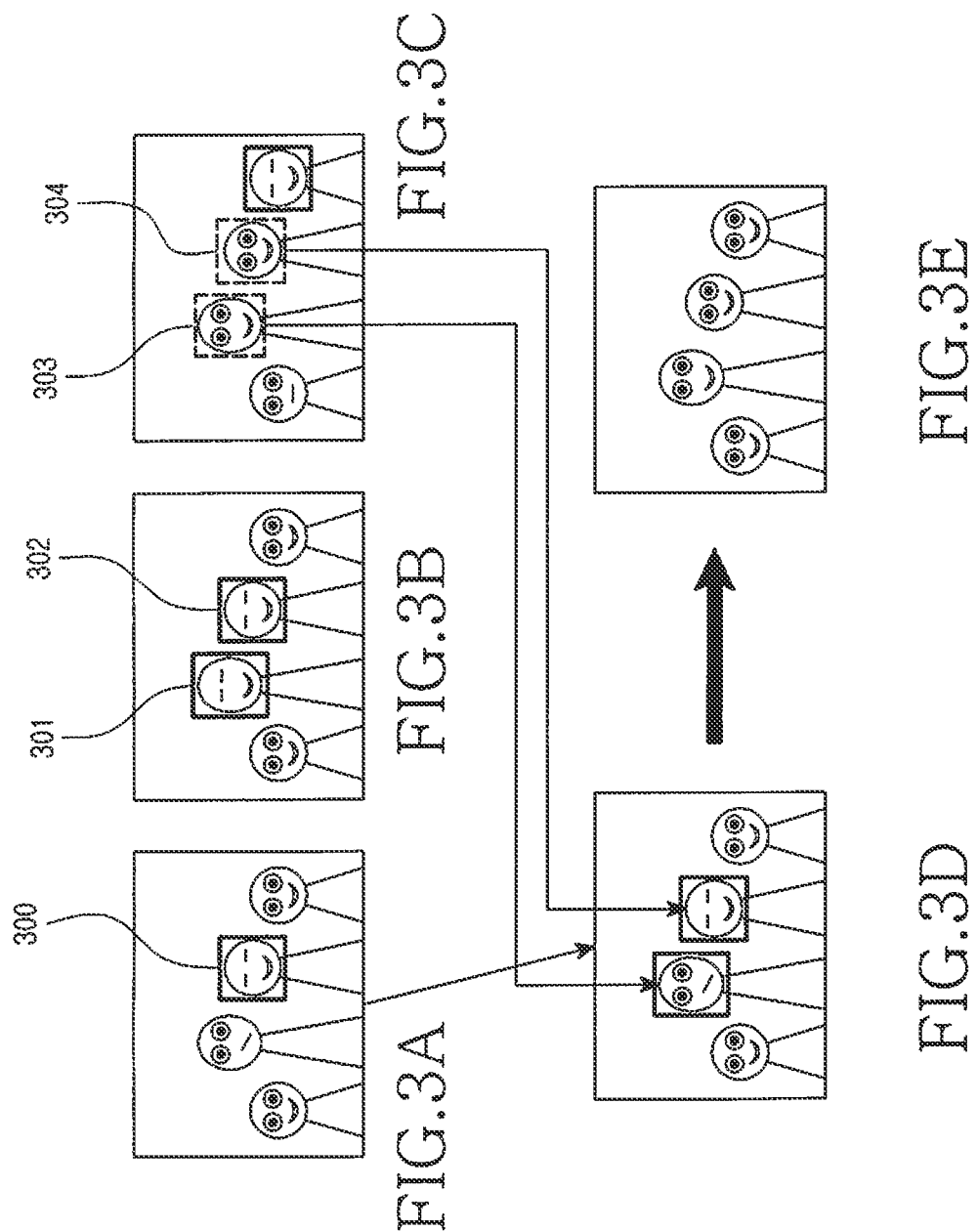
FIGS. 3A to 3E are views illustrating a process of generating an image based on a filtering face score and a selection face score according to a first embodiment of the present invention.

FIG. 2 is a flowchart illustrating a process for generating an image based on the filtering face score and the selection face score according to an embodiment of the present invention.

In step 200, the image photographing unit 10 photographs 'M' images, and outputs the M photographed images to the face image detection unit 30. Herein, M is an integer, and M equals 1 when the first image is photographed.

In step 201, the face image detection unit 30 detects a number of face images 'N' from the photographed images. Herein, N is an integer.

In step 202, the face score calculation unit 40 calculates the filtering face score for each of the N detected face images. Herein, the filtering face score is used in determining whether to re-photograph an image.

In step 203, the image determination unit 50 determines whether an image having at least one calculated filtering face score at least equal to the predetermined threshold is included in the M photographed images. Herein, the predetermined threshold is a reference value used in determining whether to re-photograph an image.

If an image having at least one calculated filtering face score at least equal to the predetermined threshold is not included in the M photographed images, the image determination unit 50 stores the corresponding photographed image in step 204, and outputs an image re-photographing signal for photographing an M+1$^{th}$ image to the image photographing unit 10 in step 205, and steps 200 to 203 are subsequently performed again.

If an image having at least one calculated filtering face score at least equal to the predetermined threshold is included in the M photographed images, the image determination unit 50 determines whether the current photographed image is the first photographed image in step 206.

If it is determined that the current photographed image is the first photographed image in step 206, the image determination unit 50 outputs the photographed image to the final image output unit 70 in step 209.

As a result of the determination, if it is determined that the current photographed image is not the first photographed image, the image determination unit 50 sets the photographed image having the greatest number of face images having the filtering face score at least equal to the threshold among the M photographed images as a reference image in step 207. Herein, the term "reference image" refers to a picture serving as a reference in synthesizing the images.

In step 208, the image synthesis unit 60 synthesizes the set reference image with the face image having the highest selection face score amongst the N face images among the M−1 photographed images. The term "highest selection face score" refers to the highest score among the calculated filtering face scores, which indicates that the user will be satisfied with the face image. Further, the image synthesis unit 60 coordinates the locations of the remaining face images based on the reference image so as to revise an image location that has been changed during the synthesis of the image.

In step 209, the final image output unit 70 outputs the image synthesized in the image synthesis unit 60 as the final image.

In the present example, it is assumed that the image photographing unit photographs an image as shown in FIG. 3A. At this time, the face image detection unit 30 detects 4 face images from the image of FIG. 3A, and the face score calculation unit 40 calculates the filtering face score for each of the 4 face images. If the third person has closed eyes, as shown in reference number 300, the calculated filtering face score will be less than the threshold. Then, the face score calculation unit 40 outputs the image re-photographing signal to the image photographing unit 10 and the image photographing unit 10 photographs an image shown in FIG. 3B. If the second and third people close their eyes, as shown in reference numbers 301 and 302 in FIG. 3B, the face score calculation unit 40 outputs the image re-photographing signal again.

Thereafter, if an image as shown in FIG. 3C is photographed, the face image detection unit 30 detects face images from the image of FIG. 3C and the face score calculation unit 40 calculates the filtering face score for each of 4 detected face images.

The image determination unit 50 determines whether at least one filtering face score at least equal to the predetermined threshold is included in the calculated filtering face scores of the face images of FIGS. 3A, 3B, and 3C.

As described above, the third person closes his eyes in FIG. 3A, resulting in photographing the image of FIG. 3B, and the second and third people close their eyes in the image of FIG. 3B, resulting in photographing the image of FIG. 3C. In this example, the third person continuously closes the eyes in the first two images, causing the filtering face score of the third person to be less than the threshold.

Therefore, the image determination unit 50 outputs the image re-photographing signal to the image photographing unit 10 so as to continuously re-photograph an image until the filtering face score of the third face comes arrives at a score at least equal to the threshold.

If the filtering face score of the third face is at least equal to the threshold, as shown in FIG. 3C, the image determination unit 50 ceases outputting the image re-photographing signal to the image photographing unit 10. Then, the image determination unit 50 sets the image of FIG. 3A as the reference image, as shown in FIG. 3D, and the image synthesis unit 60 coordinates the face images 303 and 304 in FIG. 3C with the image of FIG. 3D and synthesizes the face images 303 and 304 with the image of FIG. 3D. At this time, the final synthesized image is generated as FIG. 3E.

As described above, according to an embodiment of the present invention, multiple images are photographed based on the filtering face score and the final image including the face images having the highest selection face score among the photographed images is output in order to photograph the group picture with which the user is most satisfied.

A method for generating an image according to another embodiment of the present invention, in which the image is continuously photographed in a predetermined number of photographing times, the selection face score is calculated for each of the photographed images, and the image is synthesized based on the calculated selection face score, is described with reference to FIG. 4.

Figure 4:
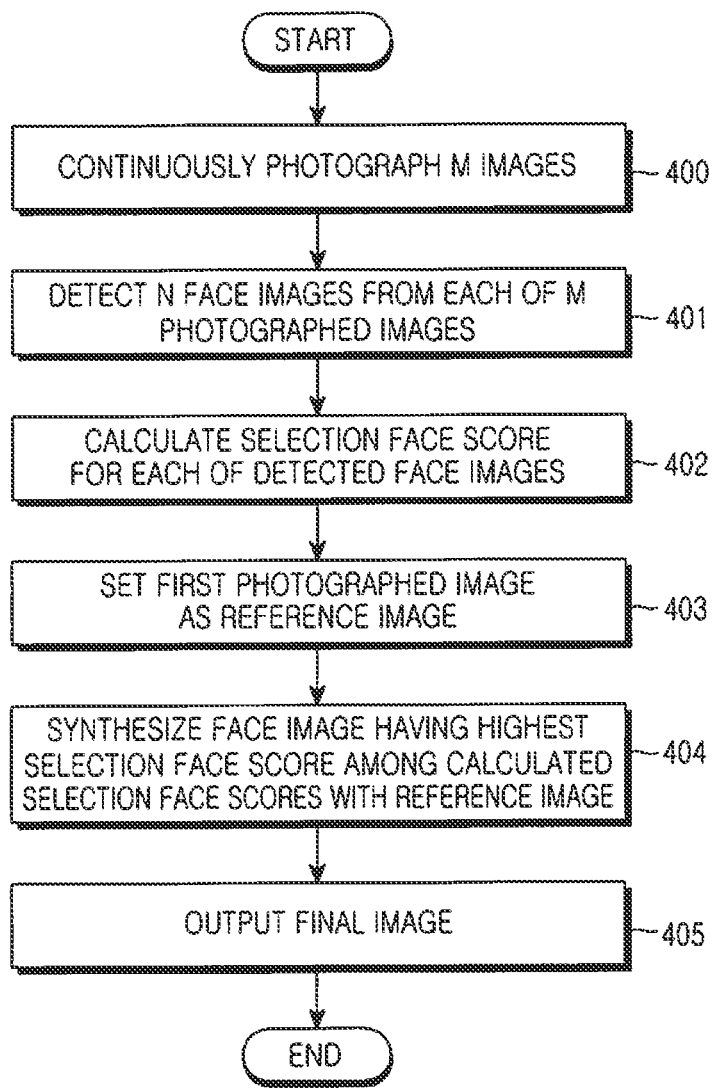
FIG. 4 is a flowchart illustrating a process of continuously photographing an image in a predetermined number of photographing times and generating an image based on a selection face score according to a second embodiment of the present invention.

FIG. 4 is a flowchart illustrating a process of continuously photographing an image a predetermined number of times and generating an image based on the selection face score according to an embodiment of the present invention.

Referring to FIG. 4, in step 400, the image photographing unit 10 continuously photographs M images according to the predetermined number of photographing times.

In step 401, the face image detection unit 30 detects N face images from each of the M photographed images.

In step 402, the face score calculation unit 40 calculates a selection face score for the N face images detected from each of the M photographed images. Herein, the selection face score refers to a score serving as a reference used in determining whether the user will be satisfied with the photographed image.

In step 403, the image determination unit 50 sets the first photographed image as a reference image.

In step 404, the image synthesis unit 60 selects N face images having the highest selection face score among the selection face scores of the N face images detected from each of the M photographed images and synthesizes the selected face image with the reference image.

In step 405, the final image output unit 70 outputs the image synthesized in the image synthesis unit 60 as the final image.

As such, it is possible to generate a most satisfactory image for the user with only a small amount of calculation within the predetermined number of photographs.

A method for generating an image according to yet another embodiment of the present invention, in which an image is continuously photographed based on the selection face score and synthesized according to the highest selection face score from among the photographed images, is described as follows with reference to FIG. 5.

Figure 5:
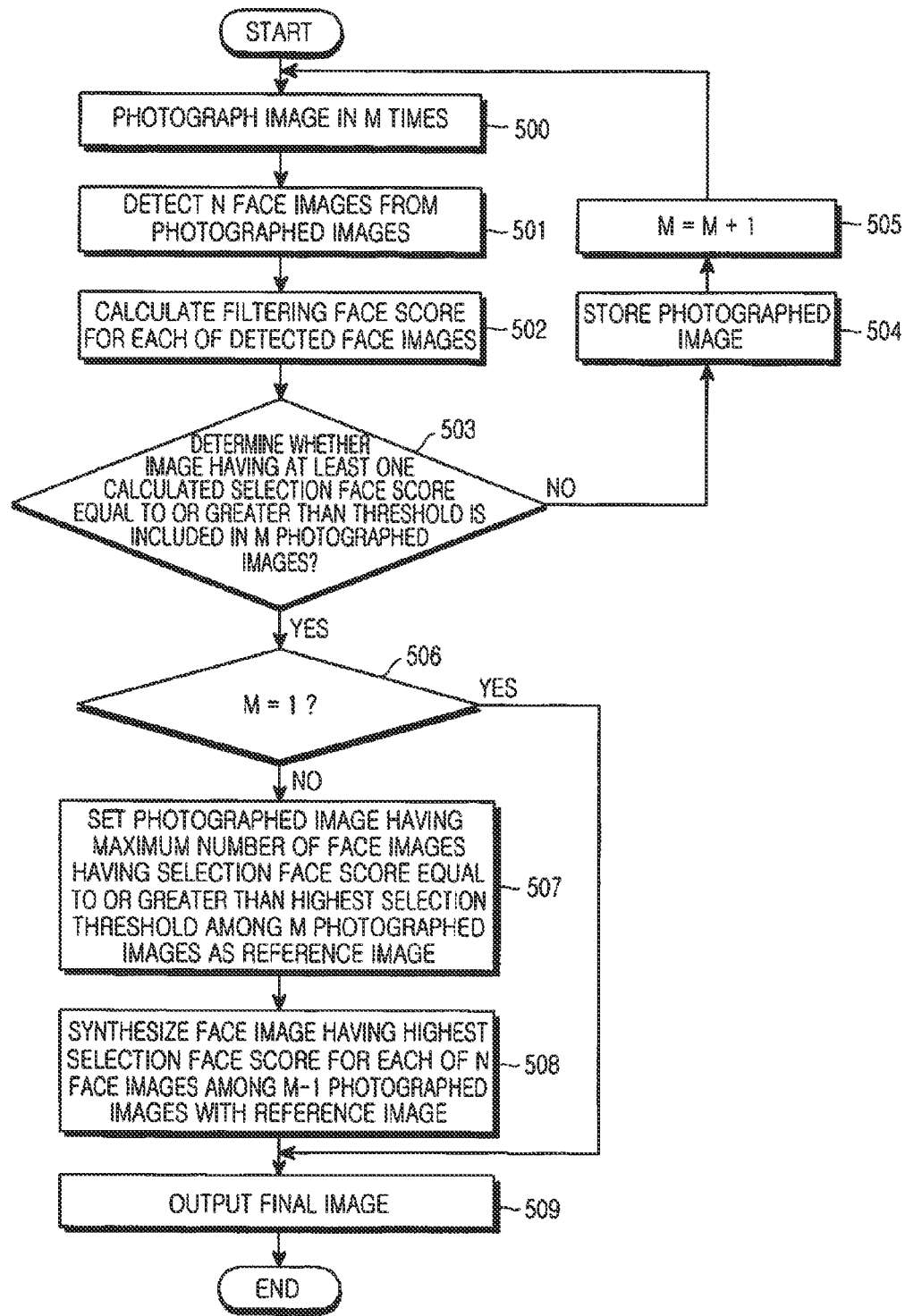
FIG. 5 is a flowchart illustrating a process of continuously photographing an image based on a selection face score and synthesizing the image among the photographed images according to the highest selection face score according to a third embodiment of the present invention.

FIG. 5 is a flowchart illustrating a process of continuously photographing an image based on the selection face score and synthesizing the image among the photographed images based on the highest selection face score according to an embodiment of the present invention.

Referring to FIG. 5, in step 500, the image photographing unit 10 photographs M images and outputs the photographed images to the face image detection unit 30. Herein, M is an integer, and M equals 1 for the first photographed image.

In step 501, the face image detection unit 30 detects N number of face images from the photographed images.

In step 502, the face score calculation unit 40 calculates a selection face score for each of the N detected face images.

Herein, the selection face score refers to a face score used in determining whether the photographed image is a satisfactory image for the user.

In step 503, the image determination unit 50 determines whether an image having at least one calculated selection face score at least equal to a predetermined highest selection threshold is included in the photographed images. In this example, the term "predetermined highest selection threshold" refers to a reference value for determining whether a user is the most satisfied with the face image. The highest selection threshold according to FIG. 5 may be set higher than the predetermined threshold the embodiment of the present invention described with reference to FIG. 2.

If an image having at least one calculated selection face score at least equal to the predetermined highest selection threshold is not included in the photographed images, the image determination unit 50 stores the corresponding photographed image in step 504 and outputs an image re-photographing signal for photographing an $M+1^{th}$ image to the image photographing unit 10 in step 505, and steps 500 to 503 are subsequently performed again.

If an image having at least one calculated selection face score at least equal to the predetermined highest selection threshold is included in the photographed images, the image determination unit 50 determines whether the current photographed image is the first photographed image in step 506.

As a result of the determination, if it is determined that the current photographed image is the first photographed image, the image determination unit 50 outputs the photographed image to the final image output unit 70 in step 509.

As a result of the determination, if it is determined that if the current photographed image is not the first photographed image, the image determination unit 50 sets the photographed image having a greatest number of face images having a selection face score at least equal to the highest selection threshold among the M photographed images as a reference image in step 507.

In step 508, the image synthesis unit 60 selects a face image having the highest selection face score from among each of the N face images in the M−1 photographed images and synthesizes the selected face image with the set reference image. The term "highest selection face score" refers to the highest score among the calculated selection face scores, which indicates that the user will be most satisfied with the face image. Further, the image synthesis unit 60 coordinates the locations of the remaining face images based on the reference image so as to revise an image location changed during the synthesis of the image.

In step 509, the final image output unit 70 outputs the image synthesized in the image synthesis unit 60 as a final image.

As described above, the embodiment of the present invention described with reference to FIG. 5, includes selecting a face image with which the user will be satisfied based on the selection face score and outputting the final image using the face image having a highest selection face score among the selected face images, in order to photograph a image with which the user will be most satisfied.

Finally, a method for generating an image according to further another embodiment of the present invention, in which only a face image that requires re-photographing among the photographed images is re-photographed, and the re-photographed face image is synthesized, will be described as follows with reference to FIG. 6.

Figure 6:
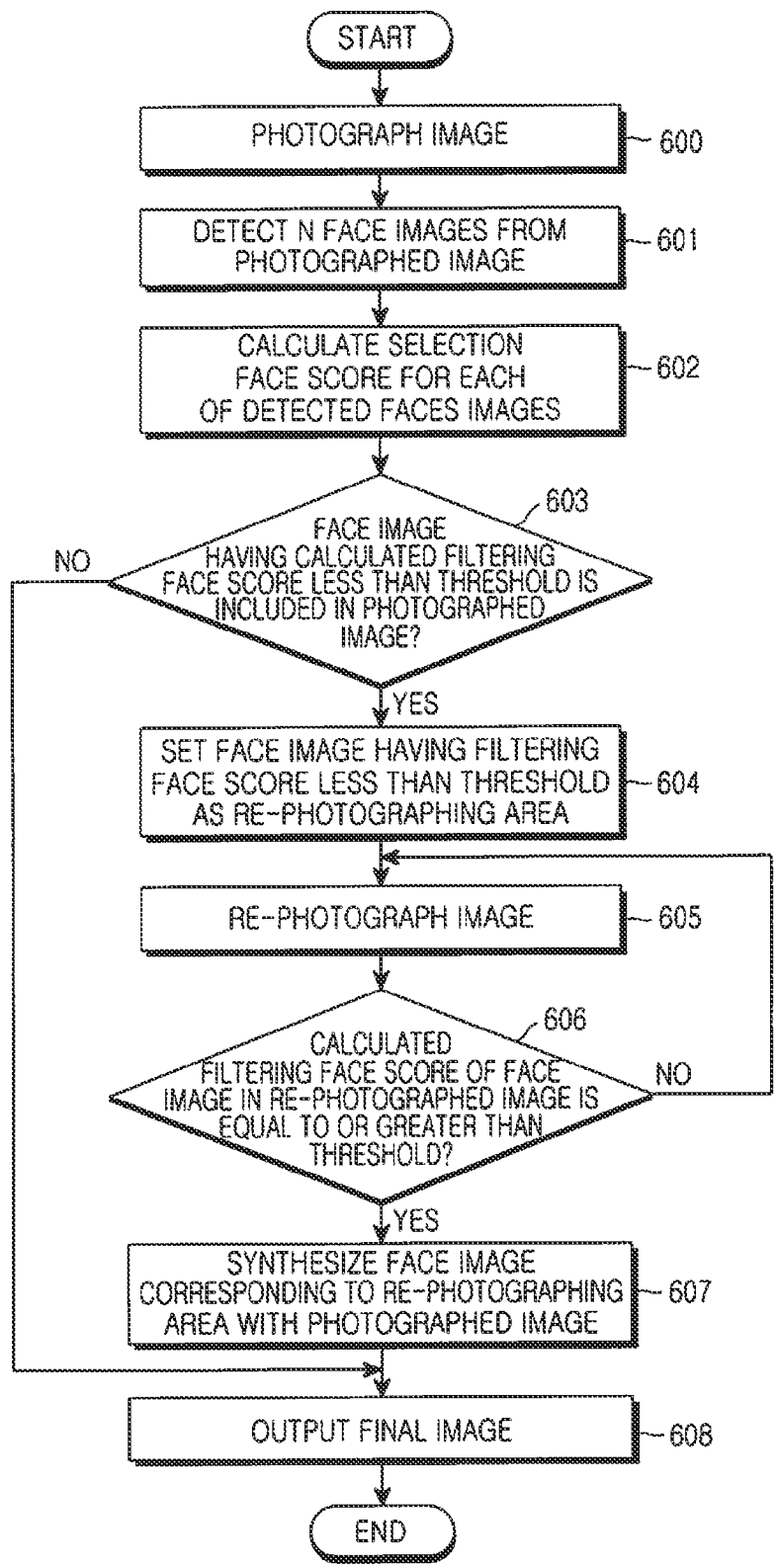
FIG. 6 is a flowchart illustrating a process of re-photographing only a face image that requires re-photographing in the photographed images and synthesizing the re-photographed face image according to a fourth embodiment of the present invention.

FIG. 6 is a flowchart illustrating a process of re-photographing only a face image that requires re-photographing among the photographed images and synthesizing the re-photographed face image according to an embodiment of the present invention.

Referring to FIG. 6, in step 600, the image photographing unit 10 photographs an image and outputs the photographed image to the face image detection unit 30.

In step 601, the face image detection unit 30 detects N of face images from the photographed image.

In step 602, the face score calculation unit 40 calculates the filtering face score for each of the N detected face images.

In step 603, the image determination unit 50 determines whether a face image having a calculated filtering face score less than a predetermined threshold is included in the photographed image.

If the face image having a calculated filtering face score less than the predetermined threshold is included in the photographed image, the image determination unit 50 proceeds to step 604. However, if a face image having the calculated filtering face score less than the predetermined threshold is not included in the photographed image, the image determination unit 50 transfers the photographed image to the final image output unit 70 and outputs a final image in step 608.

In step 604, the image determination unit 50 sets the face image having the filtering face score less than the predetermined threshold as a re-photographing area. At this time, the re-photographing area can be set together with a predetermined size of area 701, as shown in FIG. 7, in addition to the face image area.

In step 605, the image determination unit 50 outputs a signal for re-photographing only the set re-photographing area to the image photographing unit 10, and the image photographing unit 10 photographs only the re-photographing area, and the face image detection unit 30 detects a face image in the re-photographed area and the face score calculation unit 40 calculates a filtering face score of the detected face image.

In step 606, the image determination unit 50 determines whether the calculated filtering face score is at least equal to the threshold. If the calculated filtering face score is at least equal to the threshold, the method proceeds to step 607. However, if the calculated filtering face score is less than the threshold, the image photographing unit 10 re-photographs the re-photographing area in step 605, and the image determination unit 50 sets the photographed image as a reference image.

Figures 7A, 7B:
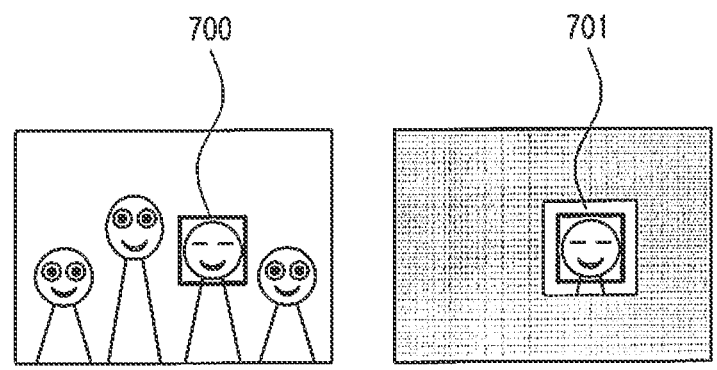
FIGS. 7A and 7B are example displays of photographed images according to a process of re-photographing only a face image that requires the re-photographing in the photographed images and synthesizing the re-photographed face image according to a fourth embodiment of the present invention.

For example, if the image photographing unit 10 photographs an image as shown in FIG. 7A, the face image detection unit 30 detects 4 face images from the image of FIG. 7A, and the face score calculation unit 40 calculates the filtering face score for each of the 4 face images. Since the third person has closed eyes, the filtering face score of the face image 700 is less than the predetermined threshold.

The image determination unit 50 determines the face image 700 as a face image for re-photographing and sets the selected face image as the re-photographing area. At this time, the re-photographing area can be set together with a predetermined size of area 701 of FIG. 7 in addition to the face image area.

After setting the re-photographing area, the image photographing unit 10 re-photographs only the face image corresponding to the re-photographing area as shown in FIG. 7B. At this time, according to the present invention, the remaining image from the re-photographed image, except for the face image corresponding to the re-photographing area, after re-photographing the image, may be deleted.

In step 607, the image synthesis unit 60 coordinates the reference image with the face image corresponding to the re-photographing area and synthesizes the reference image with the face image.

As described above, the present invention can advantageously generate the image including the well-photographed face images based on the face score numerically expressing the degree of how well the face image has been photographed, so that it is possible to provide the user with the most satisfactory picture.

Further, the present invention can advantageously calculate a face score for multiple people from the continuously photographed multiple images, determine a best-photographed face image for each person in the multiple images based on the calculated face score, and synthesize the determined face images into a single image, in order to photograph an image with which the photographed people are most satisfied.

While the present invention has been shown and described with reference to certain embodiments and drawings thereof, it will be understood by those skilled in the art that various changes in form and details may be made therein without departing from the spirit and scope of the invention as defined by the appended claims.

What is claimed is:

1. An apparatus for generating an image including multiple photographed people, comprising:
    an image photographing unit for photographing images;
    a face image detection unit for detecting face images for each of the photographed images;
    a face score calculation unit for calculating a face score for each of the face images detected from each of the photographed images;
    an image determination unit for determining whether each of the face scores calculated for each of the face images is at least equal to a predetermined threshold; and
    an image synthesis unit for synthesizing each of face images having a highest face score among the face images, and outputting the synthesized image as a final image.

2. The apparatus as claimed in claim 1, wherein the face score calculation unit calculates a filtering face score used for determining whether to re-photograph an image or a selection face score used for determining whether an image is satisfactory.

3. The apparatus as claimed in claim 2, wherein the face score calculation unit calculates filtering face scores for each of the face images detected from each of the photographed images, and
    the image determination unit determines whether a face image having a calculated filtering face score at least equal to a predetermined threshold is included in the face images.

4. The apparatus as claimed in claim 3, wherein, if a face image having a calculated filtering face score at least equal to the predetermined threshold is included in the face images, the image determination unit sets the image having a greatest number of face images having a filtering face score at least equal to the threshold among the photographed images as a reference image for image synthesis, and
    the image synthesis unit selects face images having a highest selection face score among the filtering face scores calculated for each of the face images and synthesizes the selected images with the reference image.

5. The apparatus as claimed in claim 3, wherein if a face image having a calculated filtering face score at least equal to the predetermined threshold is not included in the face images, the image determination unit sends a re-photographing signal for re-photographing an image to the image photographing unit.

6. The apparatus as claimed in claim 2, wherein the image photographing unit continuously photographs a predetermined number of images,
    the face score calculation unit calculates the selection face score for each of the face images detected from each of the photographed images, and
    the image synthesis unit selects a face image having a highest selection face score among the selection face scores calculated for each of the face images and synthesizes the selected face image with a first photographed image.

7. The apparatus as claimed in claim 2, wherein the face score calculation unit calculates the selection face score for each of the face images detected from each of the photographed images, and
    the image determination unit determines if a face image having the calculated selection face score at least equal to a highest selection threshold is included in the face images.

8. The apparatus as claimed in claim 7, wherein if the face image having a calculated selection face score at least equal to the highest selection threshold is included in the face images, the image determination unit sets an image having a greatest number of face images having a selection face score at least equal to the highest selection threshold among the photographed images as the reference image, and
    the image synthesis unit selects face images having a highest selection face score among the selection face scores calculated for each of the face images and synthesizes the selected face images with the reference image.

9. The apparatus as claimed in claim 8, wherein if a face image having a calculated selection face score at least equal to the highest selection threshold is not included in the face images, the image determination unit sends a signal for re-photographing an image.

10. The apparatus as claimed in claim 1, wherein if the image photographing unit photographs a single image, the face image detection unit detects the face images from the single photographed image,
    the face score calculation unit calculates a filtering face score for each of the detected face images, and
    the image determination unit determines whether a face image having a calculated filtering face score less than a predetermined threshold is included in the face images.

11. The apparatus as claimed in claim 10, wherein if a face image having a calculated filtering face score less than the predetermined threshold is included in the face images, the image determination unit sets the face image having the filtering face score less than the predetermined threshold as a re-photographing area for re-photographing and sends a signal for photographing only the set re-photographing area to the image photographing unit.

12. The apparatus as claimed in claim 11, wherein if the image photographing unit photographs a face image corresponding to the re-photographing area, the face score calculation unit calculates a filtering face score of the re-photographed face image,
    the image determination unit determines whether the calculated filtering face score is at least equal to the predetermined threshold, and
    the image synthesis unit synthesizes the single image with the re-photographed face image if the calculated filtering face score is at least equal to the predetermined threshold.

13. A method for generating an image including multiple photographed people, the method comprising the steps of:
- photographing images;
- detecting face images from each of the photographed images;
- calculating a face score for each of the face images detected from each of the photographed images;
- determining whether the face score detected for each of the face images is at least equal to a predetermined threshold;
- synthesizing each of face images having a highest face score among the face images; and
- outputting the synthesized image as a final image.

14. The method as claimed in claim 13, further comprising:
- calculating a filtering face score used for determining whether to re-photograph an image for each of the face images detected from each of the photographed images; and
- determining whether a face image having a calculated filtering face score at least equal to the predetermined threshold is included in the face images.

15. The method as claimed in claim 14, further comprising:
- if a face image having the filtering face score at least equal to the predetermined threshold is included in the face images, setting an image having a greatest number of face images having a filtering face score at least equal to the predetermined threshold among the photographed images as a reference image for image synthesis; and
- selecting face images having a highest filtering face score among the filtering face scores calculated for each of the face images and synthesizing the selected face images with the reference image.

16. The method as claimed in claim 15, further comprising, if a face image having the calculated filtering face score at least equal to the predetermined threshold is included in the face images, re-photographing an image.

17. The method as claimed in claim 13, further comprising:
- continuously photographing a predetermined number of images;
- calculating a selection face score used for determining whether an image is satisfactory for each of the face images detected from each of the photographed images; and
- selecting a face image having a highest selection face score among the selection face scores calculated for each of the face images and synthesizing the selected image with the first photographed image.

18. The method as claimed in claim 13, further comprising:
- calculating a selection face score for each of the face images detected from each of the photographed images; and
- determining whether a face image having the filtering face score at least equal to a predetermined highest selection threshold among the selection face scores is included in the face images.

19. The method as claimed in claim 18, further comprising:
- if a face image having a calculated selection face score at least equal to the highest selection threshold is included in the face images, setting an image having a greatest number of face images having the selection face score at least equal to the highest selection threshold among the photographed images as the reference image; and
- selecting face images having a highest selection face score among the selection face scores calculated for each of the face images and synthesizing the selected face images with the reference image.

20. The method as claimed in claim 19, further comprising, if a face image having a calculated selection face score at least equal to the highest selection threshold is included in the face images, re-photographing an image.

21. The method as claimed in claim 13, further comprising:
- if a single image is photographed, detecting face images from the single photographed image;
- calculating a filtering face score for each of the detected face images; and
- determining whether a face image having the calculated filtering face score less than a predetermined threshold is included in the face images.

22. The method as claimed in claim 21, further comprising:
- if a face image having a calculated filtering face score less than the predetermined threshold among the calculated filtering face scores is included in the face images, setting the face image having the filtering face score less than the predetermined threshold as a re-photographing area for re-photographing a face image; and
- photographing only the set re-photographing area.

23. The method as claimed in claim 22, further comprising:
- calculating a filtering face score of the re-photographed face image if a face image corresponding to the re-photographing area is photographed,
- determining whether the calculated filtering face score is at least equal to a predetermined threshold; and
- if the calculated filtering face score is at least equal to the predetermined threshold, synthesizing the single image with the re-photographed face image.

* * * * *